US008458953B2

(12) United States Patent
Hunter et al.

(10) Patent No.: US 8,458,953 B2
(45) Date of Patent: *Jun. 11, 2013

(54) HIGH SPEED SEED TREATMENT APPARATUS

(75) Inventors: James L. Hunter, Maxwell, IA (US); Timothy P. Meyer, Des Moines, IA (US)

(73) Assignee: Pioneer Hi-Bred International, Inc., Johnston, IA (US)

( * ) Notice: Subject to any disclaimer, the term of this patent is extended or adjusted under 35 U.S.C. 154(b) by 1315 days.

This patent is subject to a terminal disclaimer.

(21) Appl. No.: 11/939,241

(22) Filed: Nov. 13, 2007

(65) Prior Publication Data

US 2009/0119986 A1    May 14, 2009

(51) Int. Cl.
*A01G 5/06*      (2006.01)
*A01C 1/06*      (2006.01)

(52) U.S. Cl.
USPC ............................... 47/57.6; 427/4

(58) Field of Classification Search
USPC ................................ 427/4; 47/57.6
See application file for complete search history.

(56) References Cited

U.S. PATENT DOCUMENTS

| 3,848,772 | A | * | 11/1974 | Aanestad et al. | 222/617 |
| 4,449,642 | A | * | 5/1984 | Dooley | 221/211 |
| 4,465,017 | A | | 8/1984 | Simmons | |
| 4,491,246 | A | * | 1/1985 | Dooley | 222/129 |
| 5,718,768 | A | | 2/1998 | Ido | |
| 5,750,466 | A | * | 5/1998 | Wedegaertner et al. | 504/100 |
| 5,883,383 | A | * | 3/1999 | Dragne | 250/222.2 |
| 6,070,538 | A | * | 6/2000 | Flamme et al. | 111/170 |
| 6,582,516 | B1 | | 6/2003 | Carlson | |
| 6,706,989 | B2 | | 3/2004 | Hunter et al. | |
| 7,252,048 | B2 | | 8/2007 | Nohynek | |
| 7,869,902 | B2 | * | 1/2011 | Hunter et al. | 700/240 |
| 2008/0009962 | A1 | | 1/2008 | Hood et al. | |

FOREIGN PATENT DOCUMENTS

| DE | 33 33 435 A1 | 5/1984 |
| EP | 0 776 600 A1 | 6/1997 |
| WO | WO-2004/006645 A1 | 1/2004 |

OTHER PUBLICATIONS

The International Search Report and Written Opinion for International Application No. PCT/US2008/050598, mailed Jul. 28, 2008.
GTG, "Spectracota™," <http://www.germains.com/products.asp?i=74>, printed Jul. 19, 2007.
Almaco, "Automated Processing Line," <http://www.almaco.com/products/productDetail.cfm?ProductID=80>, printed Sep. 10, 2007.
Bayer CropScience, Gustafson, "Batch Modular Coater: Installation and Operation Manual," <http://www.bayercropscience.com/BAYER/CropScience/BCSUS.nsf/files/Commercial%20Manuals/$file/bmc_man.pdf>, copyrighted 2005.

* cited by examiner

*Primary Examiner* — Timothy Meeks
*Assistant Examiner* — Mandy Louie
(74) *Attorney, Agent, or Firm* — Alston & Bird LLP

(57) ABSTRACT

An apparatus and method for treating a least a portion of one or more initial seed samples to create one or more treated seed samples for use in research applications is provided. In various embodiments, the apparatus and method utilize two or more seed treaters operating in parallel to increase throughput for treating a portion of one or more initial seed samples. The apparatus and method may also include a metering station configured to distribute at least a portion of the one or more initial seed samples to the two or more seed treaters. As a result, the apparatus and method are configured to efficiently and accurately treat seed samples.

10 Claims, 2 Drawing Sheets

HIGH SPEED SEED TREATMENT APPARATUS

FIELD OF THE INVENTION

The various embodiments of the present invention relate generally to an apparatus and method for treating one or more initial seed samples or portions thereof for use in research applications. More specifically, embodiments of the present invention provide an apparatus and method for efficiently treating at least a portion of one or more initial seed samples to create treated seed samples for use in research applications.

BACKGROUND OF THE INVENTION

Plant breeding, plant product development, plant product characterization, and plant product commercialization processes often require, for each genotype or breeding line, the creation of a large number of seed samples from a bulk or composite seed sample. For example, in agricultural research, it is often necessary to segregate a seed sample from a bulk sample such that the seed sample includes one or more selected seeds (representing a statistically-significant population, for example). Such seed samples must also sometimes be treated with a selected treatment compound (such as a particular fungicide or insecticide, for example) and packaged with a unique indicia that allows a researcher or field technician to easily identify the seed sample, as well as the handling history and treatment history of the seed sample.

High-throughput seed sample processing systems for corn and other plant seeds are described, for example, in U.S. Pat. No. 6,706,989, which is assigned to the assignee of the present application and which is incorporated herein by reference in its entirety. Such systems provide automated high-throughput capacity for cleaning and sorting a sample of seeds and placing the sample in a bag or other container with identifying information. However, conventional labor-intensive processes must be used in downstream steps, such as, for example steps for treating the sample of seeds or a portion of the sample, and for packaging seed samples into seed packets or other containers in preparation for planting or additional downstream processes. In conventional methods, these processes are carried out manually, in a very time consuming process. Typically, for treating a seed sample or portions thereof, an initial seed sample is manually loaded into a seed treater, such as for example, by lifting the initial seed sample above the seed treater. In other instances, however, a seed treater may be located at the end of an existing seed processing line. Applications of treatment material may be applied to the initial seed sample or a portion thereof by manually subdividing the initial sample into two subsamples, each to receive a different treatment. Likewise, a portion of the initial seed sample may be treated by manually subdividing the bulk sample into two fractions: one to be treated and a second to be untreated. The treatment application may rely on an operator to manually start and stop the treatment process or it may be under control of a timer. Typically, the seed treater is manually started and the treatment process ends when a timer stops the process. Although seed treatment devices may vary in design, typical seed treatment devices operate by applying an aqueous seed treatment material to the seed sample and then drying the treated seed sample. Much of the processing time of a seed treatment method is attributable to the drying step. Once the seed sample is sufficiently treated and dried, the treated sample is manually transported to a packaging station where it is packaged, typically in an envelope or other container.

In a research setting, the ability to efficiently and accurately treat seed samples is extremely important. However, conventional research methods rely heavily on the same manually operated processes described above. Such reliance on manual processes could introduce error that may be detrimental to the integrity of the results of experiments that rely on accurate and consistent seed sample treatments, not to mention increased processing times. As a result, there is a need in the art for an improved system and method of treating an initial seed sample or portions thereof. The system and method should increase throughput for treating a portion of one or more initial samples and should efficiently and accurately treat seed samples.

SUMMARY OF THE INVENTION

The embodiments of the present invention satisfy the needs listed above and provide other advantages as described below. Embodiments of the present invention may include a method for treating at least a portion of one or more initial seed samples to create one or more treated seed samples. In addition, the present invention also provides various embodiments directed to a system for treating at least a portion of one or more initial seed samples to create one or more treated seed samples.

In one embodiment, the present invention provides a method that comprises distributing at least a portion of one or more initial seed samples to one of two or more seed treaters of a seed treatment apparatus, distributing at least a portion of one or more initial seed samples to another of the two or more seed treaters, and applying at least one seed treatment material to the portions of the one or more initial seed samples distributed to the two or more seed treaters to create one or more treated seed samples, wherein the seed treaters operate in parallel and each seed treater applies seed treatment material independently of the at least one other seed treater. Some embodiments further comprise loading the one or more initial seed samples into a metering station of the seed treatment apparatus and distributing at least a portion of the one or more initial seed samples received by the metering station to the two or more seed treaters. Some embodiments further comprise distributing to a discharge hopper a portion of the one or more initial seed samples not distributed to the two or more seed treaters for reclaiming a portion of the one or more initial seed samples not used to create the one or more treated seed samples.

In some embodiments, the step of distributing at least a portion of the one or more initial seed samples comprises loading one or more initial seed samples into a bulk loading station of the seed treatment apparatus and distributing at least a portion of the one or more initial seed samples from the loading station to a metering station, and distributing at least a portion of the portion of the one or more initial seed samples from the metering station to the two or more seed treaters. Some embodiments may further comprise quantifying the portions of the one or more initial seed samples distributed by the metering station with a quantifying device. Some embodiments may further comprise distributing seed samples from the two or more seed treaters to at least one additional processing device. In some embodiments, the additional processing device may comprise one of the group consisting of a seed packaging device, a seed counting device, a seed sorting device, a seed treatment apparatus, or combinations thereof.

In some embodiments, the steps of distributing at least a portion of the one or more initial seed samples to two or more seed treaters and independently applying at least one seed treatment material to the portions of the one or more initial seed samples distributed to the two or more seed treaters occur automatically via control by at least one controller. In some embodiments, the steps of distributing at least a portion of the one or more initial seed samples from the loading station to a metering station, distributing at least a portion of the portion of the one or more initial seed samples from the metering station to the two or more seed treaters, and quantifying the portions of the one or more initial seed samples distributed by the metering station with a quantifying device, occur automatically via control by at least one controller. In another embodiment, the steps of distributing seed samples from the two or more seed treaters to the at least one additional processing device occur automatically via control by at least one controller.

Thus, the various embodiments of the seed sample treatment method and apparatus provide many advantages that may include, but are not limited to, providing a method and apparatus capable of increasing throughput time for treating a portion of one or more initial seed samples, and accurately treating the seed samples. These advantages, and others that will be evident to those skilled in the art, are provided in the various embodiments of the system and methods of the present invention.

BRIEF DESCRIPTION OF THE DRAWINGS

Figure 1:
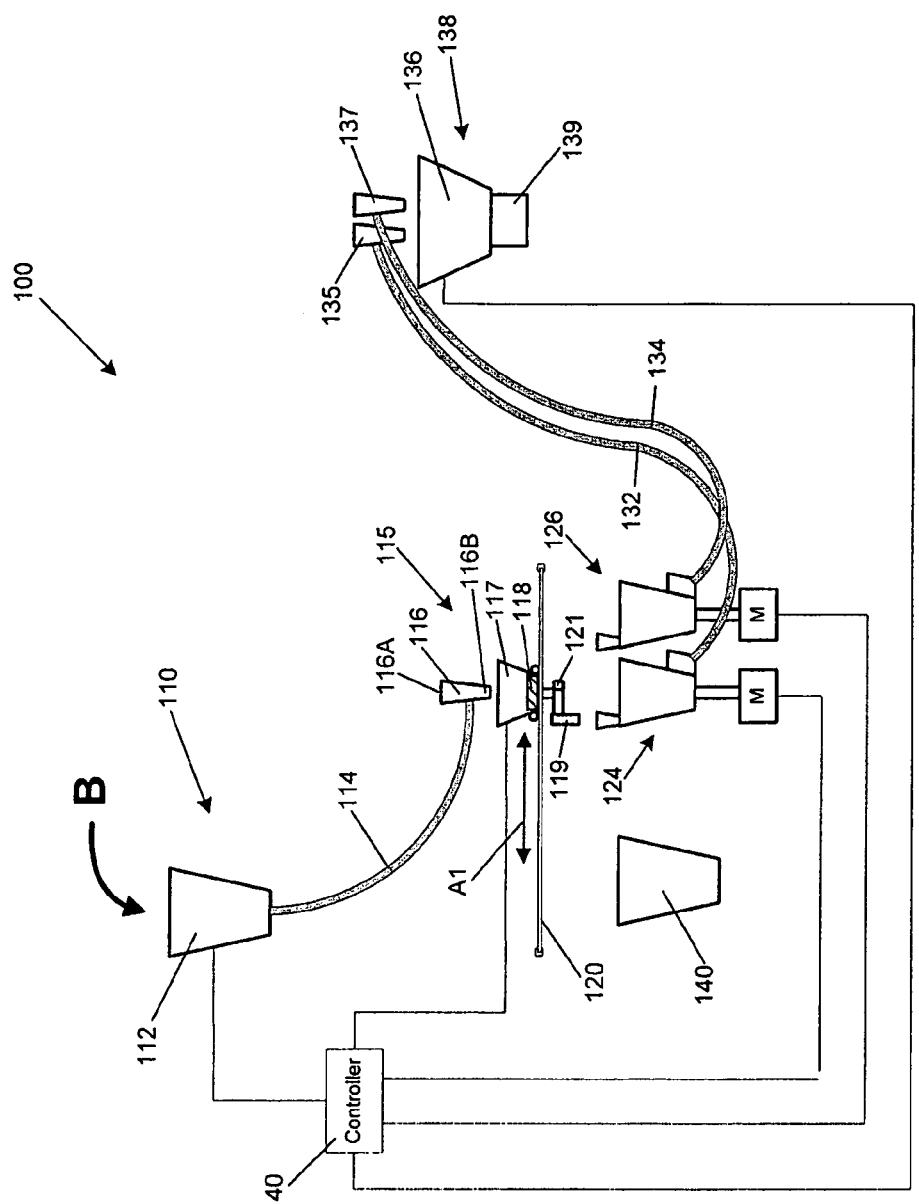
Figure 2:
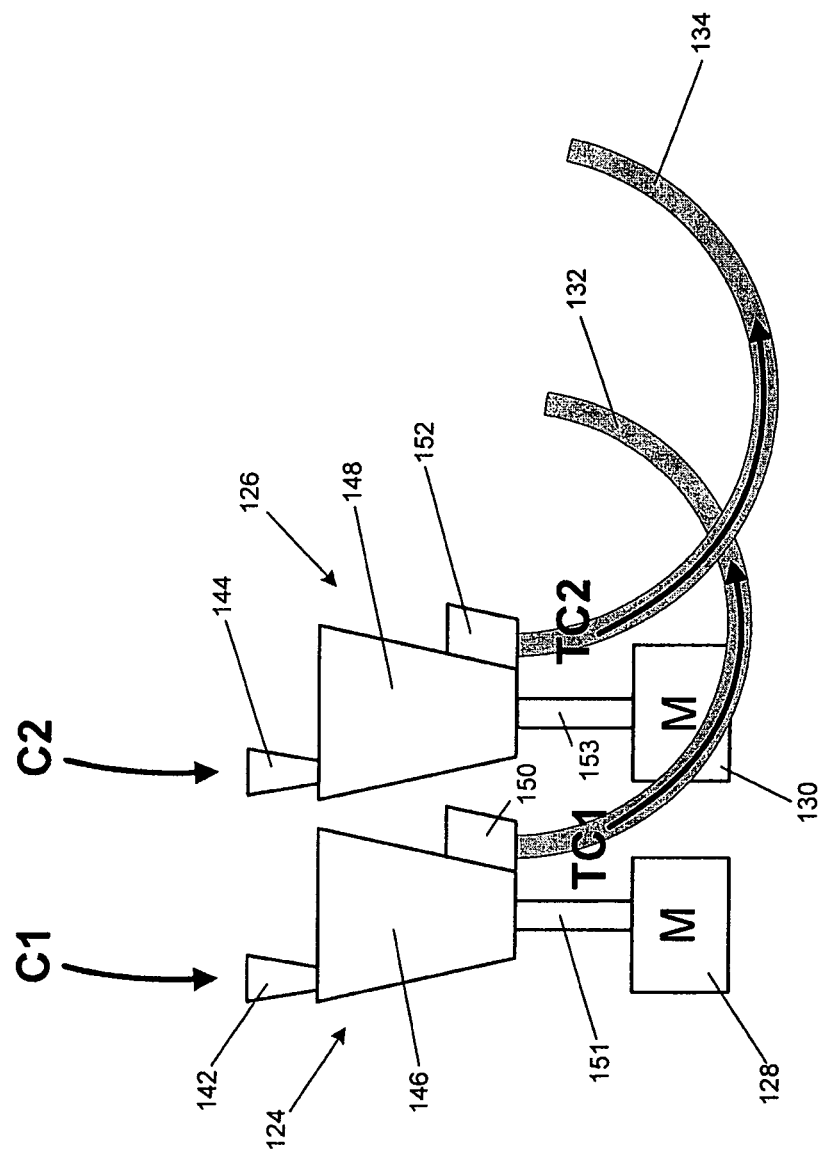

Having thus described the invention in general terms, reference will now be made to the accompanying drawings, which are not necessarily drawn to scale, and wherein:

FIG. 1 shows a perspective view of a seed treatment apparatus having first and second seed treaters in accordance with one embodiment of the present invention; and FIG. 2 shows an isolated schematic view of the first and second seed treaters of the seed treatment apparatus of FIG. 1 in accordance with one embodiment of the present invention.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

A schematic view of a seed treatment apparatus 100 in accordance with one embodiment of the present invention is shown in FIG. 1. In general, the seed treatment apparatus 100 of the depicted embodiment includes a bulk loading station 110, a metering station 115, a first seed treater 124, a second seed treater 126, and a packaging station 138. In various embodiments, a controller 40 may be included that controls one or more of various components of the seed treatment apparatus 100, including but not limited to, one or more of the following: the bulk loading station 110, the metering station 115, the first seed treater 124, the second seed treater 126, and/or the packaging device 138. Thus, for example, in various embodiments the controller 40 may control one or more functions that may include, but need not be limited to, controlling or directing the placement of a seed sample in the two or more seed treaters, controlling quantification functionality, controlling material handling of samples from a metering hopper to the two or more treaters, controlling the treatment process and metering of treatment, controlling the unloading process, or controlling pneumatic seed transport.

In the depicted embodiment, to initiate the treating process, one or more initial seed samples B are loaded at the bulk loading station 110. It should be noted that in many embodiments, a bulk loading station 110 need not be included, as seed samples may be loaded directly into the metering station 115. It should be noted that for the purposes of the current specification and appended drawings and claims, the term initial seed sample may refer to a bulk seed sample that has not yet been treated; a subsample of an untreated bulk seed sample; a previously treated bulk seed sample; a subsample of a previously treated bulk seed sample; a previously treated seed sample; or any combination of the above. The bulk loading station 110 of the depicted embodiment includes a loading hopper 112 configured to receive at least a portion of one or more seed samples B. In some embodiments the bulk loading station 110 may also include a quantifying device to quantify the seeds loaded into the loading hopper. Examples include, but are limited to, quantifying devices that measure the weight, volume, and/or the number of seeds. In the depicted embodiment, the loading hopper 112 is constructed of polyethylene, however in other embodiments the loading hopper 112 may be constructed of any material capable of receiving and at least temporarily holding the one or more initial seed samples B. In the depicted embodiment, the one or more initial seed samples B are manually loaded into the bulk loading station 110 by an operator who pours the one or more initial seed samples B into the bulk loading station 110, however in other embodiments the loading of one or more initial seed samples B may be automated and controlled by one or more controllers, such as for example, controller 40. For instance, in some embodiments, various initial seed samples B may be loaded into an automated seed loading device, such as for example, a rotating loading carousel or other distribution device that automatically unloads one or more initial seed samples B into the loading hopper 112. It should be noted that for purposes of the current specification and appended drawings and claims, the term automatic, automatically, and other forms thereof refer to operations that require little if any manual intervention.

In the depicted embodiment, at least a portion of the one or more initial seed samples B are distributed from the loading hopper 112 through a seed guide 114 to the metering station 115. The portion of seeds is distributed to the metering station 115 through the seed guide 114 via pneumatic power (pneumatic power control unit(s) not shown). However, in other embodiments the portion of seeds may be distributed to the metering station 115 by any other means, including, but not limited to, by hydraulic, gravitational, and/or mechanical means, and through closed, open, or a combination of seed guides. In the depicted embodiment, the seed guide 114 comprises flexible plastic tubing, however in other embodiments, the seed guide 114 (or any portion or combination of portions of the seed guide) may comprise other types of flexible tubing, such as other types of plastic tubing, or flexible tubing made of other materials, (e.g, corrugated stainless steel). In still other embodiments, the seed guide 114 need not be flexible, and may comprise rigid guides such as PVC or stainless steel piping. It should be noted that other embodiments may not include a metering station 115 such that portions of the one or more initial seed samples B may be distributed from the loading station directly to the first and second seed treaters 124, 126. It should be noted that other embodiments may include three or more seed treaters and that some embodiments may include a large number of seed treaters.

In general, the metering station 115 of the depicted embodiment includes a cyclone 116, a metering hopper 117, at least one quantifying device 118, and a metering output 119. An outlet 116B of the cyclone 116 distributes the portion of seeds into the metering hopper 117, located below the outlet 116B. In the depicted embodiment, the cyclone 116 operates by venting the air that carries the seeds to the metering station 115 through a top portion 116A of the cyclone 116. It should be noted that although not all embodiments of the present invention need include cyclones (such as those embodiments that rely on gravity to convey seeds). However, cyclones may be useful in applications where seed is conveyed pneumatically.

As noted above, the metering hopper 117 receives the portion of seeds from the cyclone 116 via the outlet 116B of the cyclone 116. In the depicted embodiment, the metering hopper 117 is constructed of polyethylene, however in other embodiments the metering hopper 117 may be constructed of any material capable of receiving and at least temporarily holding the portion of the seeds delivered from the loading hopper 112. The metering station 117 of the depicted embodiment includes at least one quantifying device 118, located below the metering hopper 117 and configured to quantify seeds received by and/or distributed by the metering station 115. It should be noted that in other embodiments, the at least one quantifying device 118 may be located in various other locations, including, but not limited to, above or beside the metering hopper 115. In the depicted embodiment, the quantifying device 118 comprises at least one load cell configured to measure a weight of the portions of seeds contained in the metering station 115. In various embodiments, this weight information may be used to determine the weight of seed samples distributed by the metering station 115 to the first and second seed treaters 124, 126. In other embodiments, the quantifying device may be any device configured to quantify any aspect of the seeds received and/or distributed by the metering station 115. Such quantifications may include, but are not limited to, seed counts, seed volumes, and/or seed weights. The metering station 115 may be in communication with the controller 40 so as to control the portions of seeds distributed to the first and second seed treaters 124, 126.

As noted above, in the depicted embodiment, the portion of seeds from the bulk seed sample B that is received by the metering hopper 117 is measured by the quantifying device 118. A motor 121 (such as, but not limited to, a SmartMotor servo motor produced by Animatics® Corporation) drives an auger (not visible) that is configured to distribute seeds through the metering output 119. The metering output 119 of the depicted embodiment delivers portions of seeds received by the metering station 115 to at least one of the first seed treater 124 and the second seed treater 126. In the depicted embodiment, the motor 121 is reversible and is configured to provide variable speeds. In such a manner and in conjunction with the quantifying device 118, precisely measured seeds samples from the bulk seed sample B may be delivered to the two seed treaters 124, 126.

As shown in the figure, the first and second seed treaters 124, 126 are located adjacent to each other and below the metering station 115. In the depicted embodiment, the metering hopper 117, quantifying device 118, and metering output 119 of the metering station 115 are configured to travel in a direction substantially parallel to arrow A1 in order to distribute portions of the seed received by the metering station 115 to one or both the first and second seed treaters 124, 126. In the depicted embodiment, these components of the metering station 115 travel by control of the controller 40 along one or more guide rails 120, which are disposed approximately parallel to arrow A1. The metering output 119 is located such that the metering station 115 may move to locations where the metering output 119 is disposed above the first and second seed treaters 124, 126. It should be noted that in other embodiments, a metering station and/or seed treaters may be configured in other ways in order to distribute portions of seeds. For example, in some embodiments the metering station 115 need not move in order to distribute portions of seeds to the first and second seed treaters 124, 126, rather, the metering output 119 itself may be configured to move so as to distribute portions of seeds to the seed treaters 124, 126. In other embodiments, the seed treaters 124, 126 may be configured to move to receive portions of seeds from the metering station 115. In still other embodiments, the metering station 115 may comprise separate metering outputs configured to distribute portions of seeds to the first and second seed treaters 124, 126, respectively. It should be also be noted that although the metering device shown in FIG. 1 moves generally linearly to locations where the metering output 119 is disposed above the first and second seed treaters 124, 126, in other embodiments the metering device (or the two or more seed treaters) could move in any direction or combination of directions relative to each other so that seed is disposed in the two or more seed treaters. FIG. 2 shows an isolated schematic view of the first and second seed treaters 124, 126. Referring to the figure, the seed treaters 124, 126 include seed inlet ports 142, 144, respectively. The seed inlet ports 142, 144 are configured to receive seed samples C1, C2 distributed to the first and second seed treaters 124, 126, respectively, by the metering outlet 119 of the metering station 115. In the depicted embodiment, the metering station 115 is configured to move such that the metering outlet 119 may be placed in a position above the seed inlet ports 142, 144 such that when driven by the auger, seeds distributed by the metering station 115 fall by force of gravity into the seed inlet ports 142, 144. The seed inlet ports 142, 144 direct the seed samples C1, C2 distributed by the metering station 115 to first and second seed treater bowls 146, 148, respectively. It should be noted that although the depicted embodiment shows two seed treaters 124, 126 that are of relatively the same size and configuration, in other embodiments, the seed treatment apparatus may comprise two or more seed treaters having a variety of sizes or configurations. In such a manner, for example, a seed treatment apparatus of one embodiment may include at least one small capacity seed treater and at least one larger capacity seed treater. Additionally, although not shown in the figures, in other embodiments seed may be configured to be distributed between two or more seed treaters. For example, in some embodiments, seed may be distributed from one seed treater to one or more other seed treaters prior to being processed by the packing station 138 or other further processing device.

In the depicted embodiment, the first and second seed treaters 124, 126 may be centrifugal coating devices (such as, for example the HEGE 11 Liquid Seed Treater manufactured by Wintersteiger AG of Austria). The seed treaters 124, 126 may comprise, for example, bowls 146, 148 for receiving the seed samples C1, C2, respectively, and distributing the seeds within the seed samples C1, C2 toward radial peripheries of the rotatable bowls 146, 148 via an application of centrifugal force (via rotation of a rotatable disk (not visible) disposed concentrically within the bowl and driven for example by drive shafts 151, 153 operably engaged with motors 128, 130). Seed treaters 124, 126 may further comprise seed sample treatment material dispensing devices (not shown) (such as an electro-pneumatic and/or electro-mechanically controlled syringes) for dispensing the at least one seed sample treatment material (such as a powdered, semi-liquid, and/or liquid insecticide or fungicide, for example) onto the rotatable disks as the disks are spinning within the rotatable bowls 146, 148 such that the seed sample treatment compound is distributed evenly onto the peripherally-distributed seeds via the applied centrifugal force.

Other seed sample seed treaters (and/or components thereof) may include, but are not limited to: the HEGE 14 Liquid Seed Treater (also manufactured by Wintersteiger); Wintersteiger's HEGE 12 Liquid Seed Treater (which may be used, for example, to treat seed samples that have been predistributed in well-plate seed sample containers using compressed air to agitate the seeds within the seed sample; the Cimbria Heid CC 10 Centricoater (distributed by Seedburo Equipment Company of Chicago Ill.); and Seedburo's Batch Lab Treater (BLT) (manufactured by Seedburo Equipment Company and which includes a rotatable drum for coating relatively small-number seed samples with at least one seed sample treatment compound). The BLT embodiment of the seed treaters may comprise a rotatable drum seed sample treatment device configured to separate the seeds within the seed sample and apply the at least one seed sample treatment material to the seeds within the seed sample via a syringe or other sample treatment dispensing device disposed substantially adjacent to the rotatable drum. Furthermore, the HEGE 12 Liquid Seed Treater embodiments of the seed treaters may comprise magazine seed sample treatment devices each defining at least one well for receiving a seed sample. The magazine seed sample treatment devices may further comprise nozzles for selectively conveying a source of compressed air into the at least one well to selectively agitate the seeds within the seed sample. Furthermore, the magazine seed sample treatment devices may also comprising a seed sample treatment material dispenser disposed adjacent to the nozzle and configured to apply the at least one seed sample treatment material to the agitated seeds.

As noted above, typical seed treatment processes include applying an aqueous seed treatment material to a seed sample in a single seed treater and then drying the treated seed sample. For such processes, most of the seed treatment time is spent drying the treated seeds. Embodiments of the present invention reduce the process times required for treating a portion of a bulk sample by including the two or more seed treaters, which operate independently and in parallel. For example, the two or more seed treaters may treat respective seed samples with independent treatment parameters, such as different application rates and different seed treatment materials. In this manner, seed samples may be distributed to the two or more seed treaters in an alternating manner or in such other manner that improves processing times and/or allows for customized seed samples. For example, seed sample C1 of the depicted embodiment may be distributed by the metering station 115 to the first seed treater 124, which then may begin treating the seed sample C1 with a particular seed treatment material. While the first seed treater is treating seed sample C1, the metering station 115 may distribute seed sample C2 to the second seed treater 126. Being independent of the first seed treater 124, the second seed treater 126 may begin treating the seed sample C2 with the same or some other amount of the same or some other seed treatment material, at the same or some other application rate. Also, because the first and second seed treaters 124, 126 are independent of each other, each treater may treat its respective seed sample C1, C2 regardless of the progress or condition of the other treater. In other words, the second seed treater 126 may treat the seed sample C2 during the drying step of the first seed treater 124, thus improving overall process times for creating treated seed samples. It should be noted that in various embodiments, one or more initial seed samples distributed to the two or more seed treaters may be the same initial seed sample(s) or they may be different initial seed sample(s). Additionally, seed samples need not be distributed to the two or more seed treaters concurrently. Thus, in some embodiments at least a portion of one or more initial seed samples may be distributed to one seed treater, and at any time (e.g., concurrently, sequentially, or any earlier or later time) at least a portion of one or more initial seed samples may be distributed to the other(s) of the two or more seed treaters.

Although in other embodiments the two or more seed treaters need not be in communication with a controller, in the depicted embodiment, the first and second seed treaters 124, 126 communicate with and are controlled by the controller 40. For example, in the depicted embodiment, quantification information from the quantifying device 118 may be used to monitor and/or control the type and/or amount of sample treatment compound applied by either or both the first and second seed treaters 124, 126. Specifically, the controller 40 may control either or both the first and second seed treaters 124, 126 to apply one or more seed sample treatment materials to the seed samples C1, C2 based, in part, on the respective weights of the seed samples C1, C2. As a result, by controlling the treatment of seed samples using, in some embodiments, quantification information associated with the samples to be treated, increased seed treatment accuracy and consistency may be achieved.

In the depicted embodiment, the first and second seed treaters 124, 126 may also comprise seed sample treatment outlet devices 150, 152, respectively, for selectively removing the treated seed samples TC1, and TC2 from the rotatable bowls 146, 148. Referring back to FIG. 1, the treated seed samples TC1, TC2 are transported from the seed treatment outlet devices 150, 152 through seed guides 132, 134 to the packaging station 138. It should be noted that in some embodiments, the treated seed samples may be delivered from the two or more seed treaters to additional processing devices. Such devices, may include, but are not limited to, seed counting devices, seed sorting devices, seed packaging devices, indicia printing devices, and combinations thereof. Examples of these and other additional processing devices are disclosed in U.S. patent application Ser. No. 11/774,230, which claims priority to U.S. Provisional Patent Application No. 60/806,684, both of which are assigned to the assignee of the present application and both of which are incorporated herein by reference in their entirety.

In the depicted embodiment, the treated seed samples TC1, TC2 are transported to the seed packaging station 138 via pneumatic power (pneumatic power control unit(s) not shown). However, in other embodiments the treated seed samples TC1, TC2 may be distributed to the packaging station 138 by any other means, including, but not limited to, by hydraulic, gravitational, and/or mechanical means, and through closed, open, or a combination of seed guides. In the depicted embodiment, the seed guides 132, 134 comprise flexible plastic tubing, however in other embodiments, the seed guides 132, 134 (or any portion or combination of portions of the seed guides) may comprise other types of flexible tubing, such as other types of plastic tubing, or flexible tubing made of other materials, (e.g, corrugated stainless steel). In still other embodiments, the seed guides 132, 134 need not be flexible, and may comprise rigid piping such as PVC or stainless steel piping. Alternatively, in some embodiments one or both of the seed treaters 124, 126 may be located vertically above the packaging station 138. In such embodiments, the seed treaters 124, 126 may comprise a mechanism for tilting and/or overturning the rotatable bowls 146, 148 and dumping the treated seed samples TC1, TC2 into a hopper device (see, for example, element 136) that may convey the treated seed samples TC1, TC2 to the packaging station 138.

Referring back to FIG. 1, in general, the seed packaging station 138 of the depicted embodiment comprises first and second seed cyclones 135, 137, a packaging hopper 136, and a seed packing device 139. It should be noted that in other embodiments, the apparatus 100 may include one or more additional seed packing stations, which, in some embodiments, may be seed packaging stations that are dedicated for each seed treater. The components of the packaging device 138 need not be in communication with a controller, however in the depicted embodiment the packaging device communicates with and is controlled by controller 40.

In the depicted embodiment, one end of the seed guides 132, 134 is attached to outlet the output devices 150, 152, respectively. The other end of the seed guides 132, 134 is attached to cyclones 135, 137, respectively. The packaging device 138 is configured to receive the separated treated seed samples TC1, TC2 and to dispense the treated seed samples TC1, TC2 into sample packages (not shown). In some embodiments, the packaging device 139 may automatically dispense the treated seed samples TC1, TC2 into the packages.

In some embodiments, the seed treatment apparatus 100 is also configured to reclaim a portion of the bulk seed sample B received by the loading station 110 that is not distributed to the first and second seed treaters 124, 126. Referring to FIG. 1, the seed treatment apparatus 100 includes a discharge hopper 140 located adjacent to and substantially aligned with the first and second seed treaters 124, 126 and below the metering station 115. The metering station 115 is configured to move along guide rail 120 such that the metering output 119 may be placed above the discharge hopper 140 and any portion of the bulk seed sample B received by the bulk loading station 110 that is not distributed to the seed treaters 124, 126 may be distributed to the discharge hopper 140. It should be noted that although the metering device shown in FIG. 1 moves generally linearly to locations where the metering output 119 is disposed above the discharge hopper 140, in other embodiments the metering device and/or the discharge hopper may be configured in other ways and could move in any direction or combination of directions relative to each other so that seed is disposed in the discharge hopper. In some embodiments, the discharge hopper 140 may comprise a closed container configured to capture and contain a portion of seeds from the bulk seed sample that is not treated by the seed treaters. In other embodiments, the discharge hopper 140 may include an outlet that may be attached to one end of a seed guide, the other end of which may be connected to another component of the seed treatment apparatus 100, including, but not limited to, the bulk loading station 110, the metering station 115, the first and/or second seed treaters 124, 126, or additional processing devices, such as for example, a packaging station for packaging seeds that have not be treated by the seed treaters 124, 126.

Embodiments of the present invention provide a method and apparatus for treating a least a portion of an initial seed sample to create one or more treated seed samples. In various embodiments, the method and system utilize two or more seed treaters to increase throughput for treating a portion of one or more initial samples. By providing a seed treatment apparatus comprising two or more seed treaters operating in parallel, throughput may be increased allowing seed samples to be treated by one seed treater while seeds are being loaded into or being treated by the one or more other seed treaters. Additionally, in some embodiments, very large samples may be processed across two or more seed treaters, thus allowing the large samples to be processed by smaller seed treaters. In additional embodiments, the two or more seed treaters may differ in size, thus allowing seeds to be allocated to seed treaters based on optimum capacity or other considerations designed to increase efficiency. As a result, the method and system are configured to efficiently and accurately treat seed samples.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of treating at least a portion of one or more initial seed samples to create one or more treated seed samples, the method comprising:
    distributing at least a portion of one or more initial seed samples to one of two or more seed treaters of a seed treatment apparatus;
    distributing at least a portion of one or more initial seed samples to another of the two or more seed treaters; and
    applying at least one seed treatment material to the portions of the one or more initial seed samples distributed to the two or more seed treaters to create one or more treated seed samples,
    wherein the seed treaters operate in parallel and each seed treater applies seed treatment material independently of the at least one other seed treater, and
    wherein at least one of a seed treatment application rate or a seed treatment material of the one seed treater differs from a respective seed treatment application rate or seed treatment material of the other seed treater.

2. A method according to claim 1, further comprising loading one or more initial seed samples into a metering station of the seed treatment apparatus, and wherein the steps of distributing at least a portion of one or more initial seed samples comprises distributing at least a portion of one or more initial seed samples received by the metering station to the two or more seed treaters.

3. A method according to claim 1, further comprising:
    distributing to a discharge hopper a portion of one or more initial seed samples not distributed to the two or more seed treaters for reclaiming a portion of one or more initial seed samples not used to create the one or more treated seed samples.

4. A method according to claim 1, where the steps of distributing at least a portion of one or more initial seed samples comprise:
    loading one or more initial seed samples into a bulk loading station of the seed treatment apparatus;
    distributing at least a portion of the one or more initial seed samples to a metering station; and
    distributing at least a portion of the portion of the one or more initial seed samples from the metering station to the two or more seed treaters.

5. A method according to claim 2, further comprising quantifying the portions of the one or more initial seed samples distributed by the metering station with a quantifying device.

6. A method according to claim 1, further comprising distributing seed samples from the two or more seed treaters to at least one additional processing device.

7. A method according to claim 6, wherein the additional processing device comprises one of the group consisting of:
- a seed packaging device;
- a seed counting device;
- a seed sorting device;
- a seed treatment apparatus; or
- combinations thereof.

8. A method according to claim 1, wherein the steps of distributing at least a portion of one or more initial seed samples to two or more seed treaters and independently applying at least one seed treatment material to the portions of the one or more initial seed samples distributed to the two or more seed treaters occur automatically via control by at least one controller.

9. A method according to claim 4, wherein the steps of distributing at least a portion of one or more initial seed samples from the bulk loading station to a metering station and distributing at least a portion of the portion of the one or more initial seed samples from the metering station to the two or more seed treaters, occur automatically via control by at least one controller.

10. A method according to claim 6, wherein the steps of distributing seed samples from the two or more seed treaters to at least one additional processing device occur automatically via control by at least one controller.

* * * * *